(12) United States Patent
O'Brien

(10) Patent No.: US 6,244,666 B1
(45) Date of Patent: *Jun. 12, 2001

(54) TRACTION DEVICE FOR VEHICLE WHEELS

(75) Inventor: John M. O'Brien, Tualatin, OR (US)

(73) Assignee: Power Cleat, Ltd., Tualatin, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 09/497,310

(22) Filed: Feb. 3, 2000

Related U.S. Application Data

(63) Continuation-in-part of application No. 09/284,557, filed as application No. PCT/US97/19454 on Oct. 17, 1997, and a continuation of application No. 08/909,302, filed on Aug. 11, 1997, now Pat. No. 5,810,451, and a continuation of application No. 08/733,676, filed on Oct. 17, 1996, now Pat. No. 5,788,335.

(51) Int. Cl.[7] .................................................. B60B 15/00
(52) U.S. Cl. ............................ 301/45; 301/40.1; 152/210
(58) Field of Search ................................. 301/13.1, 13.2, 301/36.1, 36.3, 39.1, 40.1, 41.1, 41.2, 41.3, 41.6, 45, 47, 49; 152/210, 216, 220

(56) References Cited

U.S. PATENT DOCUMENTS 1,749,766   3/1930   Hitchner .
2,079,501 * 5/1937   Gallagher .

(List continued on next page.)

FOREIGN PATENT DOCUMENTS

| 198148 | * | 6/1958 | (DE) . |
|---|---|---|---|
| 003721500A1 | | 1/1989 | (DE) . |
| 003800326A1 | | 7/1989 | (DE) . |
| WO9104239A1 | | 11/1990 | (DE) . |
| 4207613A1 | | 9/1993 | (DE) . |
| 0236041 | * | 9/1987 | (EP) . |
| 723612 | * | 1/1932 | (FR) . |
| 1006702 | * | 6/1954 | (FR) . |
| 83 19992 | * | 6/1985 | (FR) . |
| 659277A1 | | 9/1991 | (FR) . |
| 58-122207A | | 7/1983 | (JP) . |
| 59-114103A | | 7/1984 | (JP) . |
| 62-299408A | | 12/1987 | (JP) . |
| 363068408A | | 3/1988 | (JP) . |
| 63-145109A | | 6/1988 | (JP) . |
| 01122708A | | 5/1989 | (JP) . |
| 03167010A | | 7/1991 | (JP) . |
| 07276926A | | 10/1995 | (JP) . |
| 07309107A | | 11/1995 | (JP) . |
| 08310204A | | 11/1996 | (JP) . |
| 2901606 | * | 7/1980 | (NL) . |
| 3001483 | * | 7/1981 | (NL) . |

Primary Examiner—Russell D. Stormer
(74) Attorney, Agent, or Firm—Robert L. Harrington

(57) ABSTRACT

A tire as provided with a circumferential portion for contacting a road surface. Edge segments thereof include studs and an inflatable chamber at the edge segment is inflated and deflated to extend and withdraw the edge segments for engagement and disengagement with the road surface.

3 Claims, 11 Drawing Sheets

U.S. PATENT DOCUMENTS

| | | | |
|---|---|---|---|
| 2,201,632 | * | 5/1940 | Roessel . |
| 2,241,849 | * | 5/1941 | Fuchs . |
| 2,254,318 | * | 9/1941 | Roessel . |
| 2,377,923 | * | 6/1945 | Cawley . |
| 2,480,548 | | 8/1949 | Carhart . |
| 2,559,721 | * | 7/1951 | Kruse . |
| 2,638,384 | * | 5/1953 | Colin . |
| 2,708,470 | | 3/1955 | Gramelspacher . |
| 2,751,959 | * | 6/1956 | Blouiquist . |
| 2,765,199 | * | 10/1956 | Partin . |
| 2,835,302 | | 5/1958 | Gedge . |
| 2,903,037 | * | 9/1959 | Palmer . |
| 2,926,720 | | 3/1960 | Gosman . |
| 3,110,339 | | 11/1963 | Fickel . |
| 3,942,572 | | 3/1976 | Crandall . |
| 3,995,909 | * | 12/1976 | Van Der Lely . |
| 4,293,017 | | 10/1981 | Lambde . |
| 4,676,289 | * | 6/1987 | Yi Su . |
| 4,803,029 | | 2/1989 | Iversen . |
| 4,813,513 | | 3/1989 | Hirakawa . |
| 4,909,972 | | 3/1990 | Britz . |
| 5,109,905 | | 5/1992 | Lambe . |
| 5,398,742 | | 3/1995 | Takebayashi . |
| 5,411,070 | * | 5/1995 | Yadegar . |
| 5,419,726 | | 5/1995 | Switlik . |
| 5,609,700 | * | 3/1997 | West . |
| 5,788,335 | * | 8/1998 | O'Brien ............................ 301/45 |
| 5,795,414 | | 8/1998 | Shih . |
| 5,810,451 | * | 9/1998 | O'Brien ............................ 301/45 |

\* cited by examiner

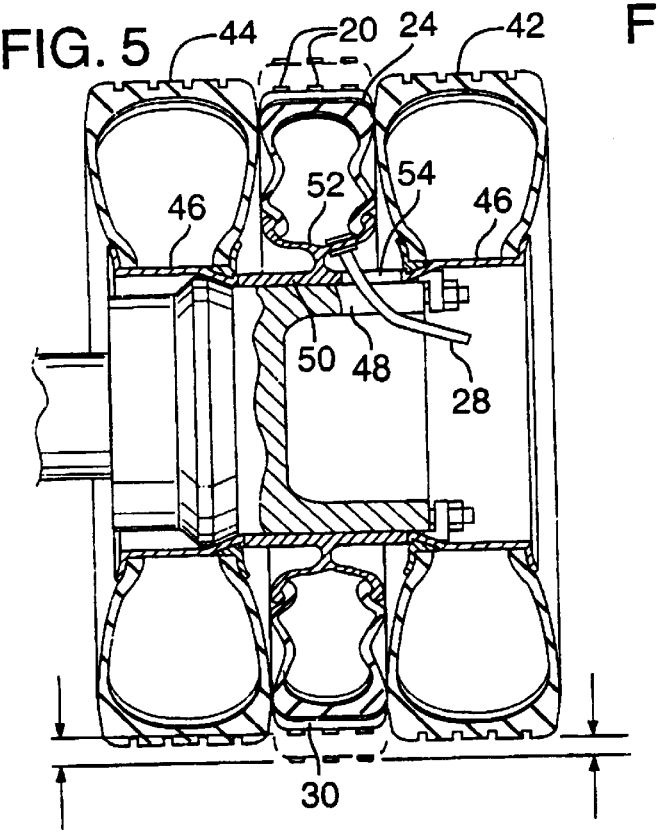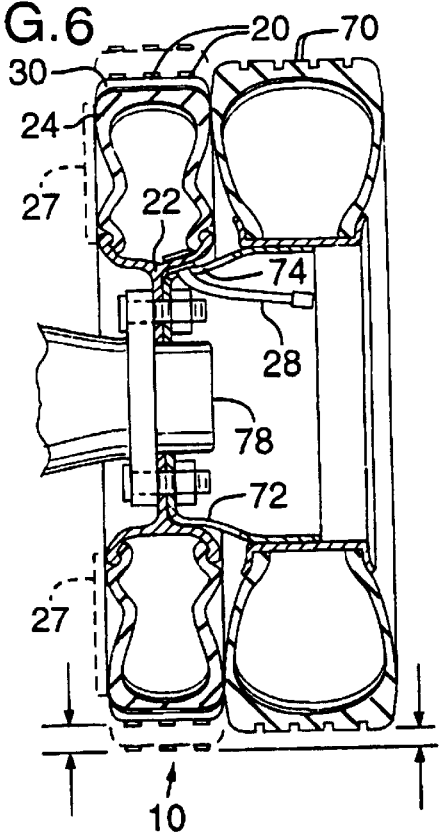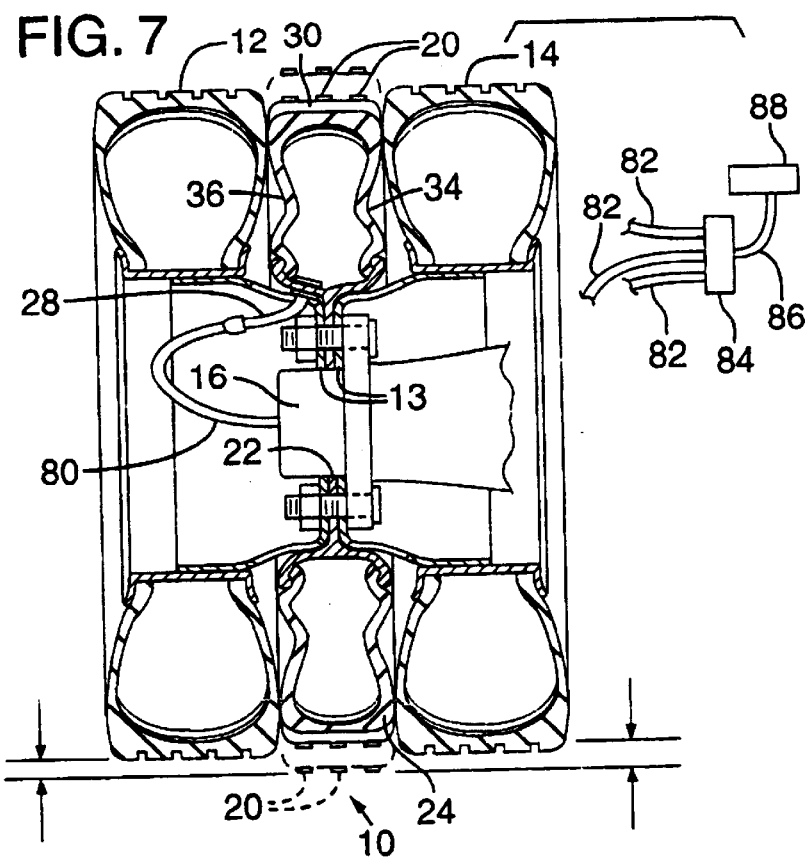

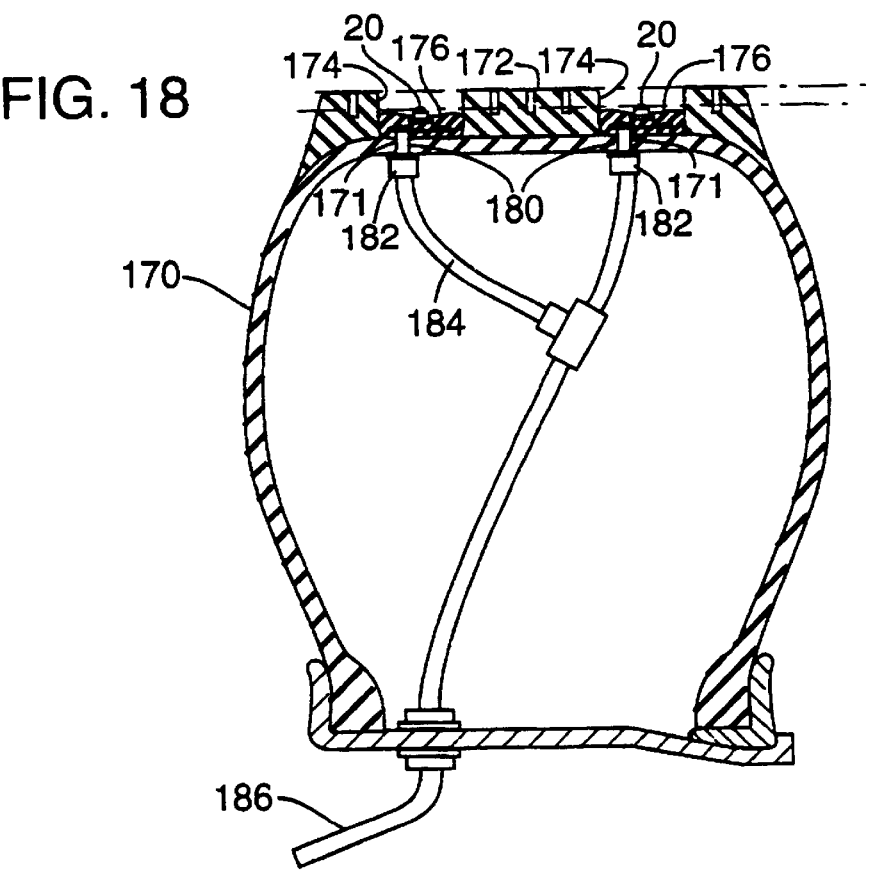
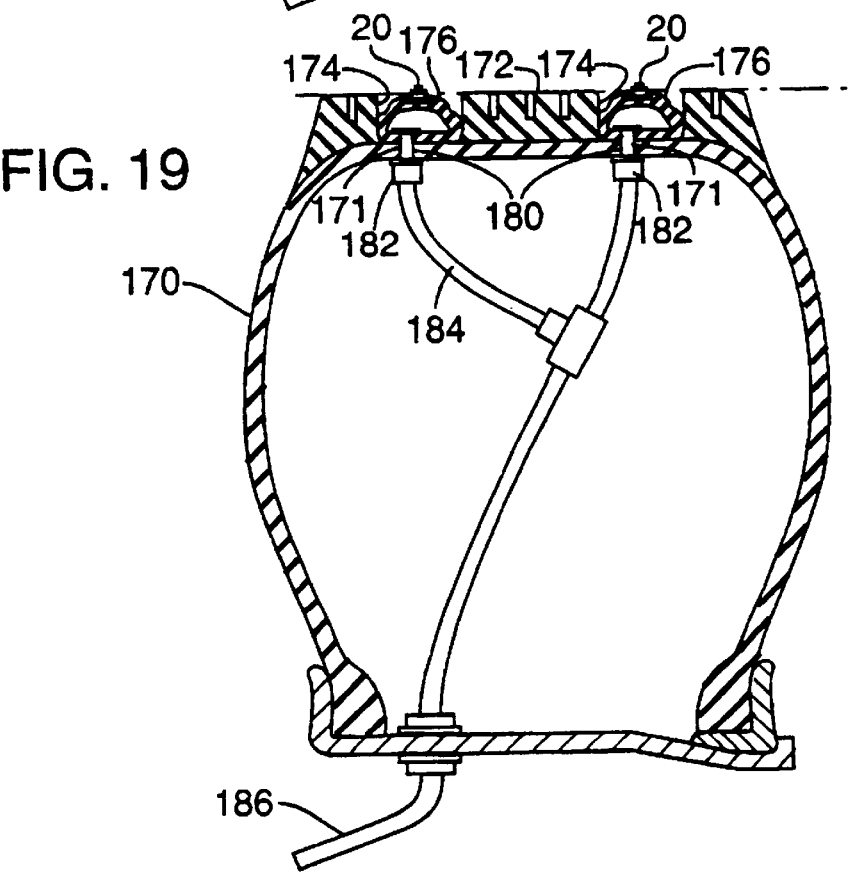

TRACTION DEVICE FOR VEHICLE WHEELS

This application is a continuation-in-part of application Ser. Nos. 09/284,557 filed Apr. 14, 1999, TRACTION DEVICE FOR VEHICLE WHEELS, which is a 371 of PCT/US 97/19454 filed Oct. 17, 1997; and a continuation of U.S. Pat. No. 08/909,302, filed Aug. 11, 1997 and now U.S. Pat. No. 5,810,451; and a continuation of U.S. Pat. No. 08/733,676, filed Oct. 17, 1996 and now U.S. Pat. No. 5,788,335. The disclosures of the above-referenced applications are included by reference.

FIELD OF THE INVENTION

This invention relates to a traction device mounted to a vehicle wheel and is selectively convertible to road engaging and non-road engaging positions.

BACKGROUND OF THE INVENTION

This invention has particular application to dual wheels as exist on large trucks. However, as will be made clear, different forms of the invention can be applied to different types of vehicle wheels.

The invention is considered most applicable to large trucks driven by truck drivers that crisscross the country continuously throughout the year. Invariably a truck driver driving over mountain roads in the winter or even flat land roads in the Northern states, will on many occasions encounter road conditions where snow and/or ice is coated over the road surface.

The conventional wheel tire provides a road contacting surface area that frictionally grips a dry or even wet road surface providing steering and stopping control as well as propulsion over the road surface, but not when that surface is covered with ice and/or snow. The conventional tire surface has poor frictional gripping capability when riding on snow or ice. Whereas several explanations can be given depending on the condition of the ice/snow, what can and often does happen is that the surface of the snow or ice liquefies and forms a liquid film between the tires and underlying surface, thereby eliminating any opportunity for the tire to grip the surface frictionally.

An answer to this dilemma is to provide the tire with metal studs or chains. The studs are embedded in the tire permanently and the chains are designed to be placed on the tire when needed and removed when not needed. In both cases, the projecting metal bites down through the snow or ice (and liquid film) to generate the desired gripping action. Both have problems. Studded tires tear up a dry road surface, i.e., when not covered with snow or ice and most states have strict rules about using them. Most states ban their use except during the harsh winter months. Tire chains are designed to be put on and taken off. However, mounting the chains onto the vehicle tires is an unpleasant task even in ideal conditions which most often is not the case. Weather conditions are likely uncomfortably cold and blustery. Mounting the chains onto the tires can take upwards to an hour or more, and when parked alongside an ice-covered roadway and probably on a graded road, the driver is exposed to potential life threatening risks as other unchained vehicles attempt to pass.

BRIEF DESCRIPTION OF THE INVENTION

The present invention alleviates or obviates the problems associated with studded tires and the chaining of tires using a retractable studded tire having metal spike-like studs that project from the periphery of the tire and into the road surface or not. In a preferred embodiment, the studded tire is sandwiched between dual tires. The studded tire is designed to expand in circumference when inflated and to contract in circumference when deflated. This is achieved in part by the opposing walls of the dual tires that restrict lateral or axial expansion of the studded tire, thus forcing expansion circumferentially or radially. The expansion characteristics of the tire are designed to provide a circumferential size difference so that when deflated, the tire periphery (circumference) is retracted radially inwardly of the dual tires and when inflated is extended radially outwardly of the dual tires.

The studded tire of this preferred embodiment is not intended to carry the vehicle weight. Essentially the stud portions only of the tire protrude and are projected into the ice or snow, e.g., to a depth at which the dual tires still engage the road surface and support the load. The studs provide gripping action for propelling (or stopping) the vehicle as the studded tire rotates in unison with the dual tires, e.g., the studded tire is mounted on the same tire lugs and the expansion of the studded tire against the opposing side walls, rubber to rubber, resists rotative slippage of the studded tire relative to the load-bearing dual tires.

The studded tire is provided with valving and an air pressure source. The air pressure source may be operated automatically and remotely with direct connection between the air pressure source and the studded tire, or the air source may be an air-pressurized cannister that can be clamped to the valving for inflating the tire. Deflation is enabled, e.g., by a valve mechanism that simply exhausts the air from the studded tire to the atmosphere.

Ideally the inflation/deflation will be accomplished automatically from the truck cab even without the necessity of stopping the truck. The less sophisticated embodiment will allow the driver to stop the truck and in a matter of a few minutes inflate the several studded tires in a fraction of the time previously allotted for mounting tire chains.

An alterative embodiment that is contemplated will adapt the above expanding feature of an expandable studded tire to a single load-bearing tire. A special single tire is produced which provides conventional (non-studded) tread portions which are separated on the tire's periphery and a studded tire segment is provided between the separated tread portions. In a further alternative embodiment, the studded segments can be provided at the side edges of the tread. Air pressure is separately provided to the studded tire segment. In a preferred form of this alternative embodiment, the studded tire segment is inflated and deflated to expose and retract the studs. In a further embodiment, it is the conventional tread portions that are deflated and inflated to achieve the same result.

Other attempts have been made to provide a gripping member that can be left on the tires and would project into the road surface only when needed. An example of such an attempt is disclosed in E. Partin, U.S. Pat. No. 2,765,199. Among other differences, Partin does not teach the basic concept of using a studded tire that is expanded in the confining space between dual tires whereby the stationary tire walls induce circumferential expansion of the studded tire beyond the circumference of the dual tires.

Reference is made to the detailed description and drawings referred to therein for a thorough understanding of the invention.

DESCRIPTION OF THE DRAWINGS

FIG. 5 is another embodiment of the traction device;

FIG. 6 is an embodiment of the traction device as applied to a single wheel;

FIG. 7 illustrates the traction device including an air source for automatic actuation of the device;

FIGS. 18–24 illustrate a wheel having a replaceable tread portion; and

DESCRIPTION OF THE PREFERRED EMBODIMENT

Figure 1:
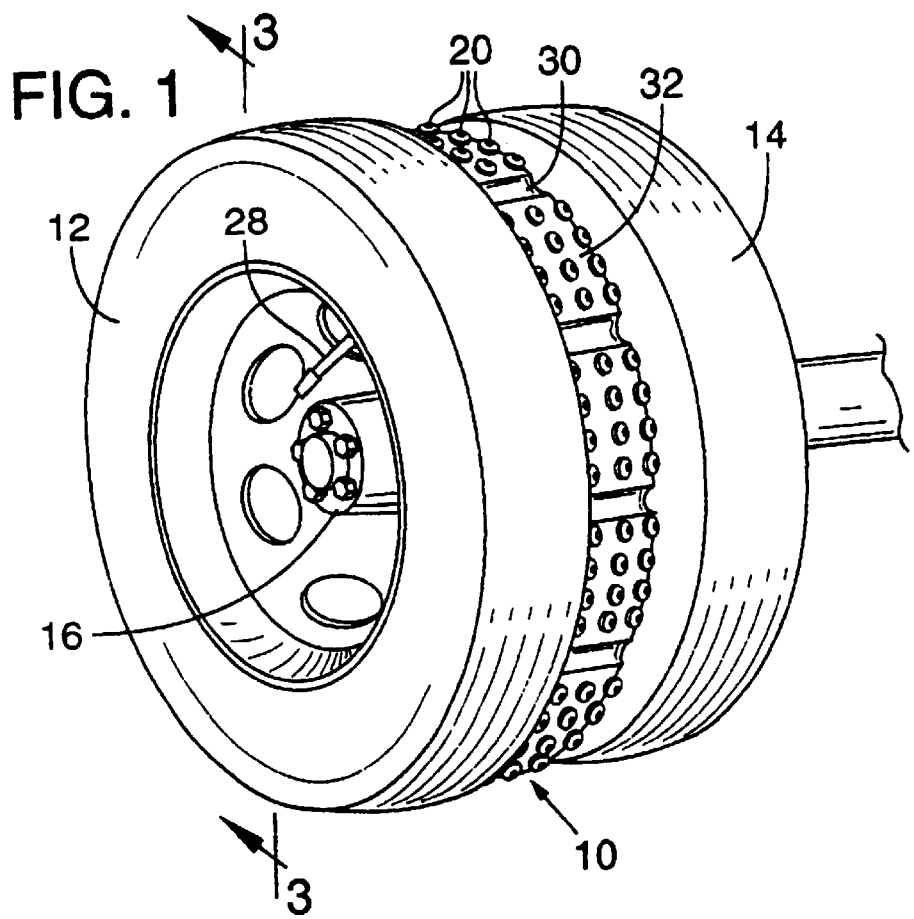
FIG. 1 is a perspective view of one embodiment of the traction device of the present invention mounted between dual wheels.

Refer now to FIG. 1 of the drawings that illustrates a traction device 10 mounted between a set of dual wheels 12, 14. The wheels 12, 14 are alike and are given separate numbers to distinguish their mounting position. The dual wheels 12, 14 are mounted on a common wheel housing 16 and as shown the outer wheel 12 is spaced from the inner wheel 14. This is typical of the dual wheel mounting arrangement in which a space is provided between the outer wheel 12 and the inner wheel 14. Note from FIG. 3 that the rim 13 of both of the inner dual wheel 14 and outer dual wheels 12 are mounted to the wheel housing 16 on conventional mounting lugs 15 (or bolts) that retain the inner wheel 14 and outer wheel 12 securely onto the wheel housing 16. The configuration of the rims 13 of the outer wheel 12 and the inner wheel 14 positions the wheels 12, 14 at a distance from each other as will be noted from FIGS. 1 and 3.

Figure 2:
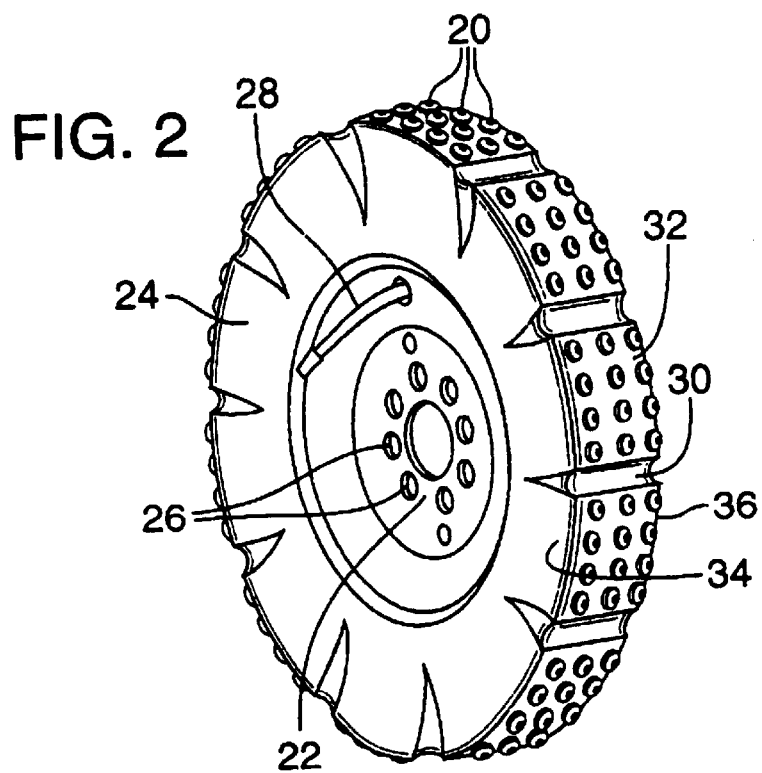
FIG. 2 is a perspective view of the traction device only.
Figure 4:
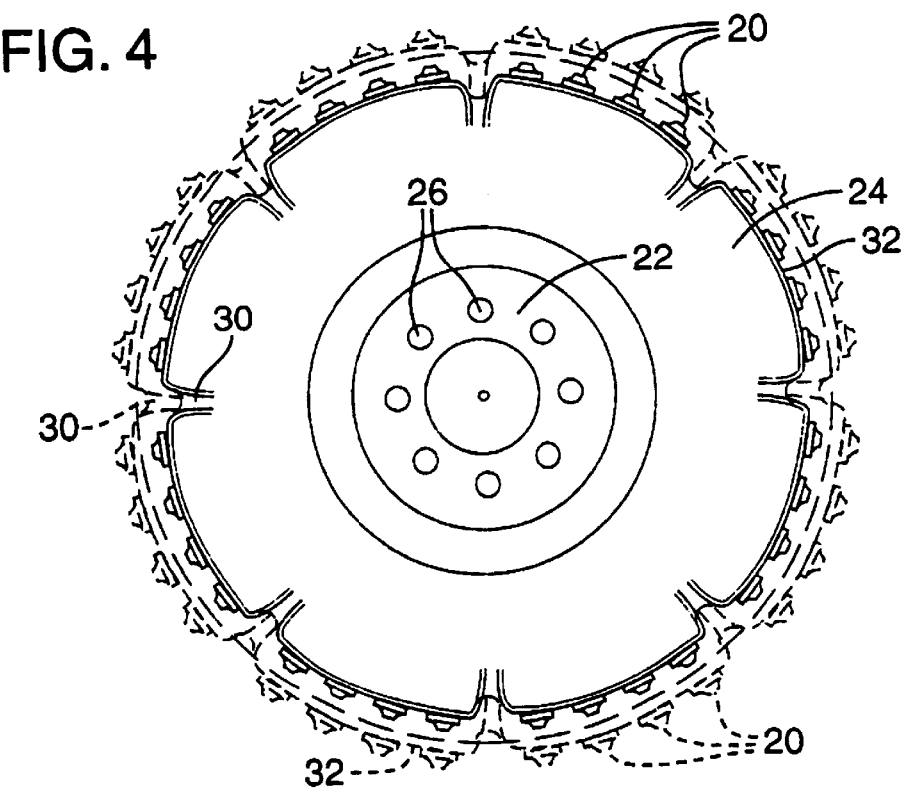
FIG. 4 is a side view of the traction device of FIG. 2 showing both retracted and expanded (in phantom) conditions thereof.

The traction device 10 not assembled to the dual tires is illustrated in FIGS. 2 and 4. The traction device 10 has a rim 22 on which a tire 24 of the traction device 10 is mounted. The rim 22 has holes 26 that are alignable with the mounting lugs or bolts 15 of the wheel housing 16. A valve stem 28 (FIG. 2) is provided to inflate the tire 24 by pressurized air and to deflate the tire 24 by exhausting the pressurized air. The tire 24 of the traction device 10 has studs 20 extending from its peripheral surface 32. The tire 24 has expansion slots 30 that are arranged to permit the radial expansion and contraction of the tire 24. As shown, the slots 30 extend across the peripheral surface 32 of the tire 24 and extend into the side walls 34, 36. The tire 24 is arranged to expand radially as pressurized air is introduced via the valve stem 28.

The introduction of pressurized air through the valve stem 28 to the interior of the tire 24 will force the tire 24 to expand radially outward and thus increase its diameter. The slots 30 are configured to enhance the uniform radial expansion of the tire 24 and to minimize the axial or lateral expansion of the tire 24.

Figure 3:
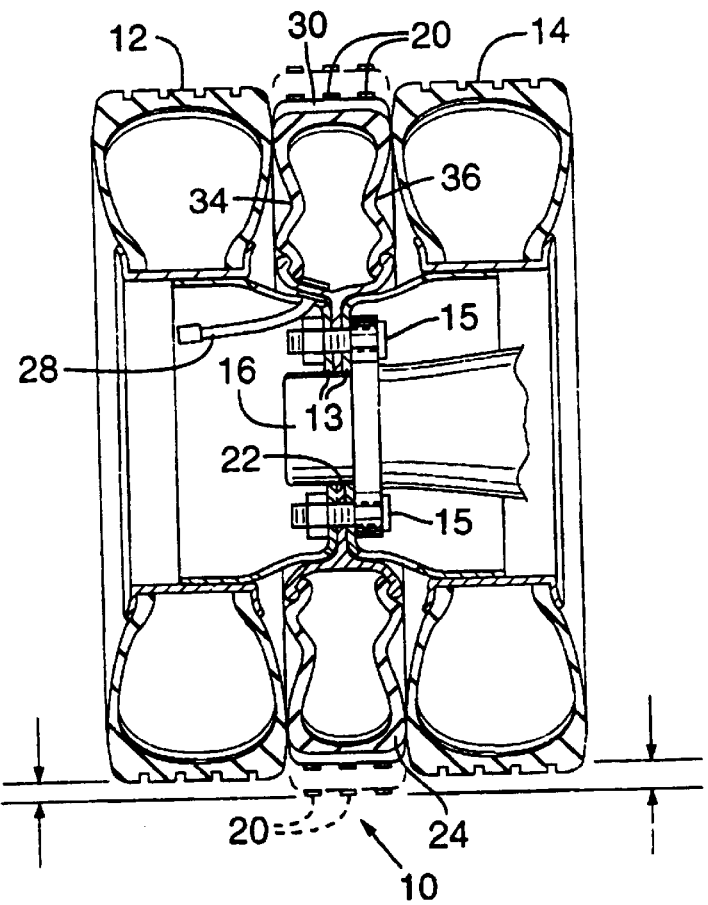
FIG. 3 is a sectional view as viewed on view lines 3—3 of FIG. 1.

The mounting arrangement of the traction device 10 is further illustrated in the sectional view of FIG. 3. In this embodiment, the wheels 12, 14 are of the same construction and have been assigned numbers 12, 14 to distinguish the inner wheel from the outer wheel. Wheels 12, 14 have a rim 13 that has a hole pattern that mates with the conventional mounting lugs of the wheel assembly 16.

As shown in FIG. 3, the rim 22 of the traction device 10 is sandwiched between the rims 13 of the inner wheel 14 and outer wheel 12. The rim 13 of the wheels 12, 14 and the rim 22 of the traction device 10 are mounted to the wheel assembly 16 and are secured by the mounting lugs or bolts 15. The traction device 10 is thus rotatable with the wheels 12, 14. The valve stem 28 extends through a conventional opening provided in the rim 13 of the wheels 12. This provides access to the valve stem 28 for inflating and deflating the tire 24 of the traction device 10. As shown in the figure, the tire 24 of the traction device 10 is illustrated in the deflated state (contracted) in solid lines and the tire 24 is shown in the inflated (expanded) state in dashed lines. In the contracted state, the tire 24 has been deflated to contract radially inward and thus the diameter of the tire 24 is less than the diameter of the wheels 12, 14. In the expanded state the tire 24 has been inflated with pressurized air to expand the tire radially to exceed the diameter of the wheels 12, 14.

The illustration of the tire 24 in the expanded state is exaggerated for illustrative purposes. The tire 24 is expanded such that the studs 20 will extend beyond the diameter of the wheels 12, 14 to engage the supporting surface (roadway). The wheels 12, 14 still supports the vehicle weight and the tire 24 provides the traction.

Referring to the dashed outline of the tire 24 of the traction device 10 of FIGS. 3 and 4 (which shows the traction device 10 in the expanded state) the tire 24 has been inflated by pressurized air. The tire 24 has expanded radially such that the diameter of the tire 24 is greater than the wheels 12, 14. The studs 20, when the tire 24 is in the expanded state, will extend beyond the diameter of the wheels 12, 14 to engage the roadway R projected through an ice or snow covering S. The studs 20 in engagement with the roadway R will provide the necessary traction required when the vehicle encounters slippery surfaces caused by ice, snow and the like. (The representation of ice/snow covering S and the projection of the studs to the roadway R is illustrative only of the expandability function of the invention and is not intended to accurately depict the manner by which gripping occurs, e.g., the studs in packed snow or ice conditions will not necessarily penetrate through to the bare roadway.)

FIG. 5 illustrates another known mounting arrangement for dual wheels on a vehicle. The wheels 42, 44 are of the same type and are reversible. That is, wheel 42 can be mounted in the position of wheel 44 and vice versa. Wheels 42, 44 have a rim 46 that is mountable onto a wheel housing spider 48. The conventional mounting of the wheels 42, 44 includes a spacer 50 positioned on the spider 48 between the wheels 42, 44. The spacer 50 is provided to space the wheels 42, 44 from each other on the wheel spider 48. In this embodiment, the spacer 50 is altered to support the traction device 10. The spacer 50 includes a wheel supporting rim 52 on which the tire 24 of the traction device 10 is mounted. The valve stem 28 is extended through a hole 54 provided in the spacer 50 with the valve stem 28 extending between two adjacent spiders 48. The tire 24 of the traction device is inflated to increase the diameter of the tire 24 to that which is larger than the wheels 42, 44 and thus to engage the road surface to provide the necessary traction. Similarly, the tire 24 is deflated to contract the tire 24 radially inward such that its diameter is less than the wheels 42, 44.

FIG. 6 illustrates the traction device 10 arranged for use with a single wheel 70. As shown, the traction device 10 and the wheel 70 are mounted to a wheel assembly 78 on conventional mounting lugs. The wheel 70 has a rim 72 configured to fit against the rim 22 of the traction device 10. The rim 72 has an opening 74 through which the valve stem 28 protrudes. The tire 24 of the traction device 10 is illustrated in the contracted state in solid line and in the expanded state in dashed lines. It is contemplated that the tire 24 may be constructed to have radial as opposed to axial expansion and alternatively a side plate 27 (in phantom lines) may be secured to the tire rim or otherwise to take the place of the moving dual wheel and force radial expansion.

The tire 24 of the traction device is inflated by conventional air sources, such as a compressed air tank. The tire 24 of each traction device 24 mounted on a vehicle may be individually inflated by manually applying pressurized air to each tire 24. Most large dual wheel vehicles have their own on board air source to provide air to the vehicle brakes, air horn and the like. Each tire 24 may thus be coupled to the air source by suitable controls and air lines to remotely inflate and deflate the tires 24 of the traction devices 10. Referring to FIG. 7, an air line 80 is coupled to the valve stem 28 of the tire 24 of the traction device 10. The air line 80 extends through the wheel housing 16 and is coupled to an air line 82 that extends to control valve(s) 84. The control valve 84 is connected to an air supply tank 88 of the vehicle by an air line 86. Additional air lines 82 are provided to couple the control valve 84 to each of the wheel housings 16 (and thus each tire 24). The control valve 84 preferably is arranged to supply air to inflate each tire 24 or deflate each tire either individually or simultaneously. The operator of the vehicle may thus inflate or deflate the tires 24 remotely without the need of stopping the vehicle.

Figure 8:
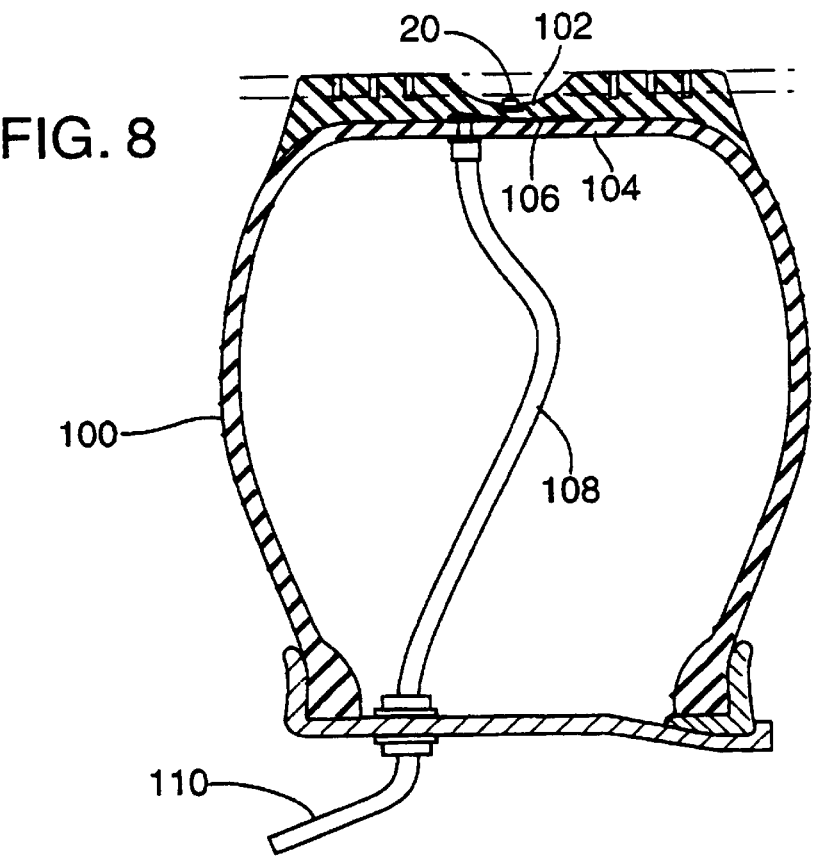
FIGS. 8 and 9 are views of a traction device as applied to a single wheel in accordance with the alternative embodiment of the invention.
Figure 9:
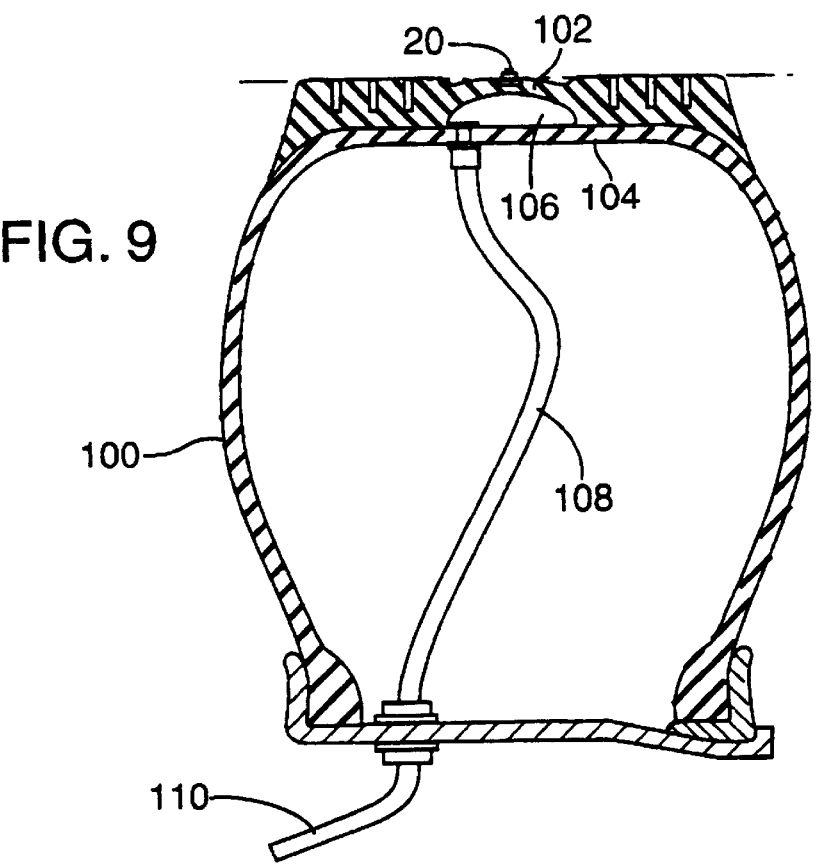

Referring now to the embodiments of FIGS. 8–24, FIGS. 8 and 9 of the drawings illustrate a traction device applied to a single wheel 100. Studs 20 are provided at spaced intervals along the center of the tread portion 102. The center tread portion 102 in combination with the tire wall 104 forms an expandable chamber 106 as shown in FIG. 9. A hose 108 connects the chamber 106 to a valve stem 110 (valve mechanism) to permit applying air pressure to the chamber 106 or relieving air pressure from the chamber 106. Air pressure is applied by a known air source, either remote or self contained on the vehicle. The chamber 106 is shown in the expanded state in FIG. 9 which forces the center tread portion 102 outwardly with reference to the wheel 100 to thus place the studs 20 into engagement with the ground surface. FIG. 8 shows the chamber 106 collapsed. That is, the air has been released from the chamber 106 and the natural resilience of the center tread portion 102 retracts the studs 20 inwardly toward the tire wall 104.

Figure 10:
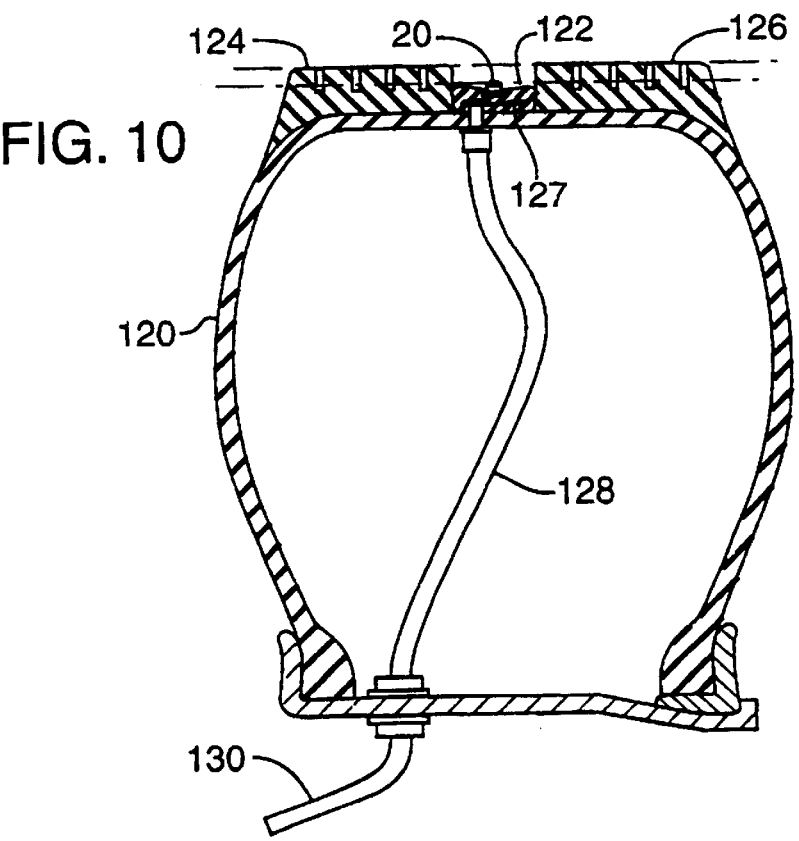
FIGS. 10 and 11 are views illustrating a further alternative embodiment the invention.
Figure 11:
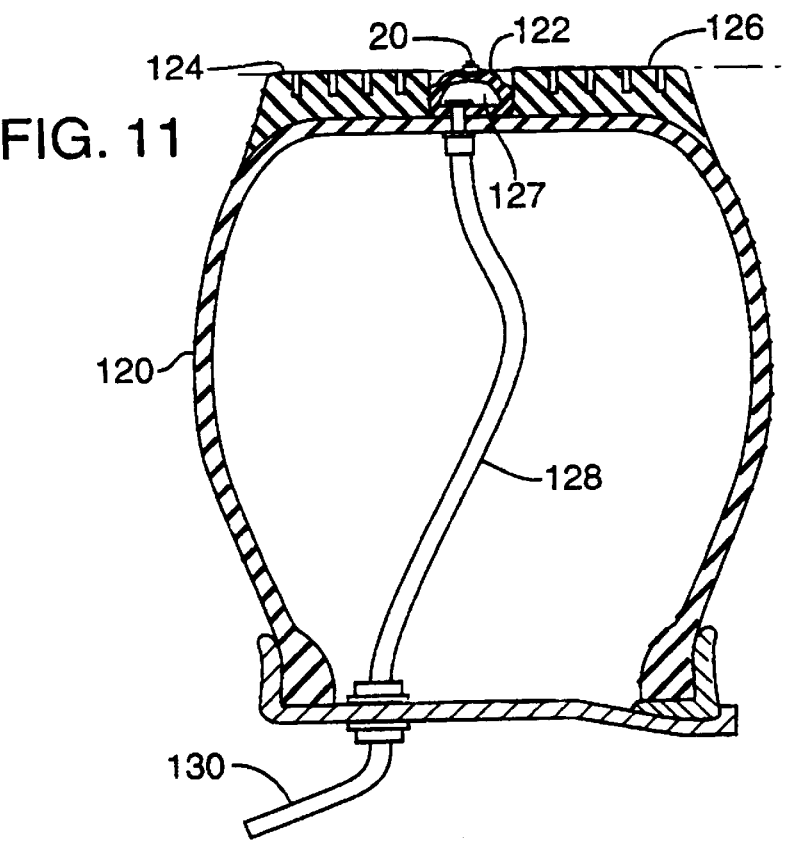

FIGS. 10 and 11 illustrate another traction device applied to a wheel 120. A center tread portion 122 is provided between the side treads 124 and 126. Studs 20 are provided at spaced intervals along the center tread portion 122. The center tread portion 122 is expandable as shown in FIG. 11 and is contractible as shown in FIG. 10. The center tread portion 122 is expanded by the application of air pressure to a chamber 127 formed within the center tread portion 122 and is contractible by releasing the air from the chamber 127. A hose 128 couples the chamber 127 to a valve stem 130. The center tread portion 122 in the expanded state as is shown in FIG. 11 places the studs 20 in contact with the road surface to provided added traction.

Figure 12:
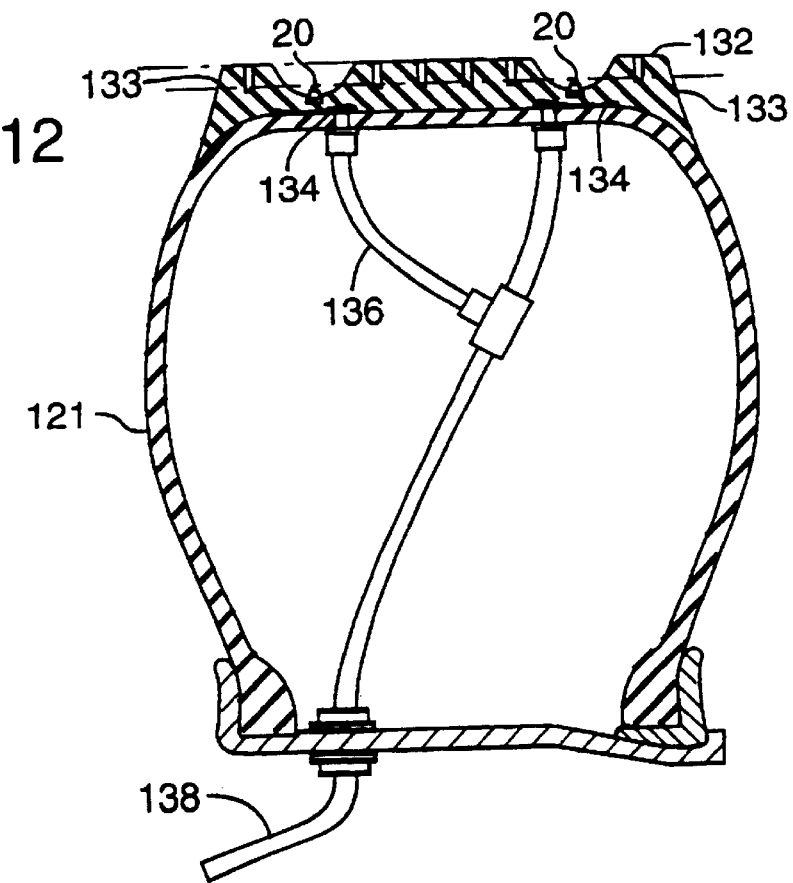
FIGS. 12 and 13 are views of a further embodiment wherein a traction device is applied to a single wheel.
Figure 13:
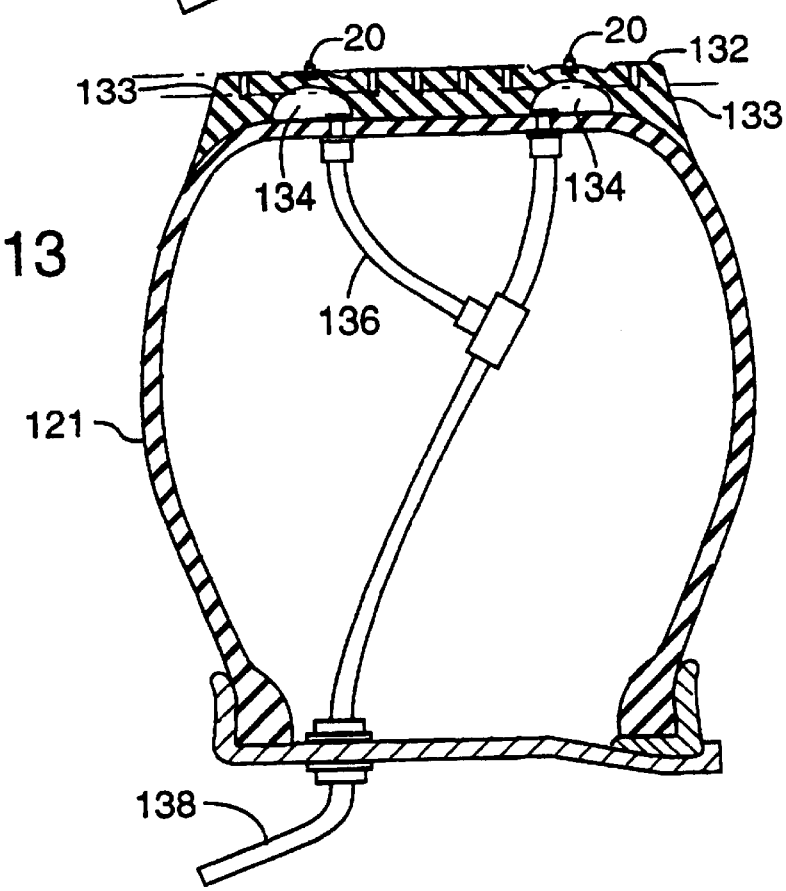

FIGS. 12 and 13 illustrate a traction device similar to those of FIGS. 8 and 9 except that in FIGS. 12 and 13 studs 20 are provided near each side edge 133 of the tire tread 132 on the wheel 121. An expandable chamber 134 is provided for each row of studs 20. A hose 136 couples each of the chambers 134 to a valve stem 138. The chambers 134 are expandable as shown in FIG. 13 and are contractible as shown in FIG. 12. The chambers 134 are expanded by applying air pressure to the chambers 134 and the chambers 134 are contracted by releasing the air from the chambers 134. When the chambers 134 are expanded, the studs 20 are moved radially outward to contact the road surface.

Figure 14:
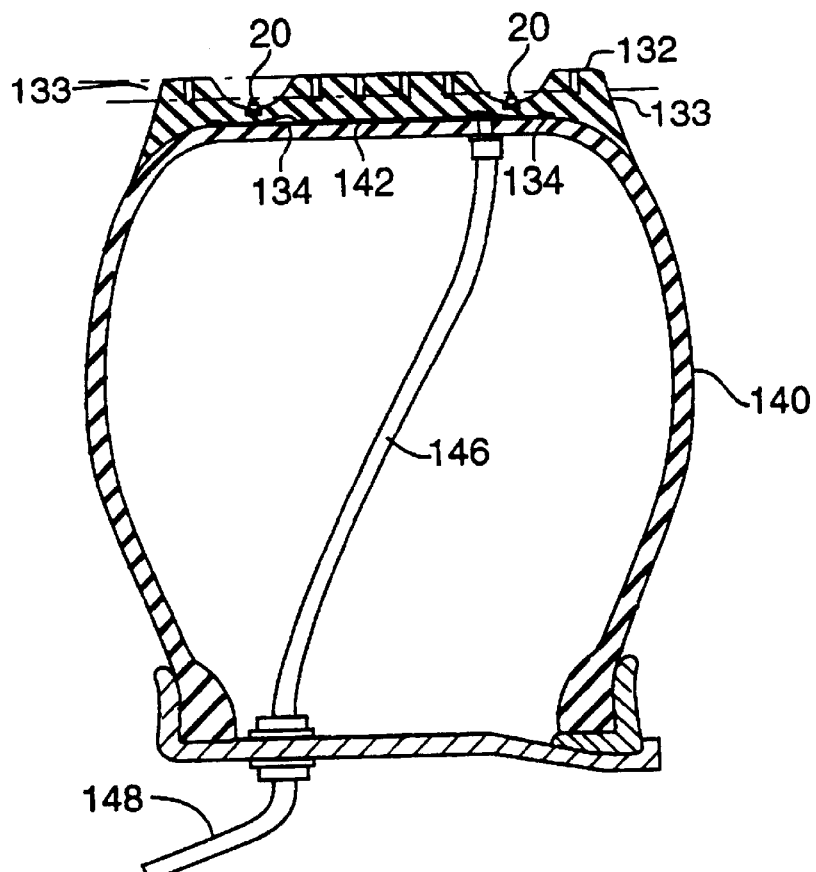
FIGS. 14 and 15 are views of a still further embodiment of a traction device as applied to a single wheel.
Figure 15:
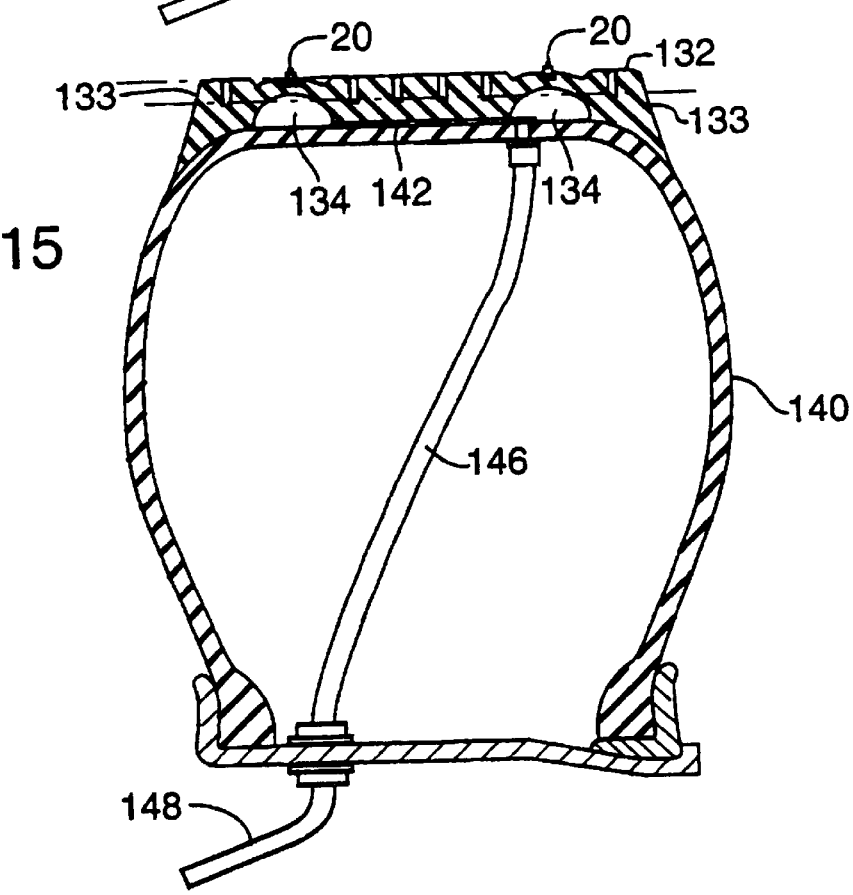

FIGS. 14 and 15 are similar to the traction devices of FIGS. 12 and 13 except that the chambers 134 are joined by a duct 142 provided in the tread 132 of the wheel 140. Preferably multiple ducts 142 are provided at spaced intervals along the length of the chambers 134. As shown in FIGS. 14 and 15, a single hose 146 is coupled to one of the chambers 134 and is connected to a valve stem 148. The chambers 134 are shown in the expanded state in FIG. 15 and are expanded by the application of air pressure. FIG. 14 illustrates the chambers 134 in the contracted or collapsed state and the chamber 134 is collapsed by releasing the air applied to the chamber 134.

Figure 16:
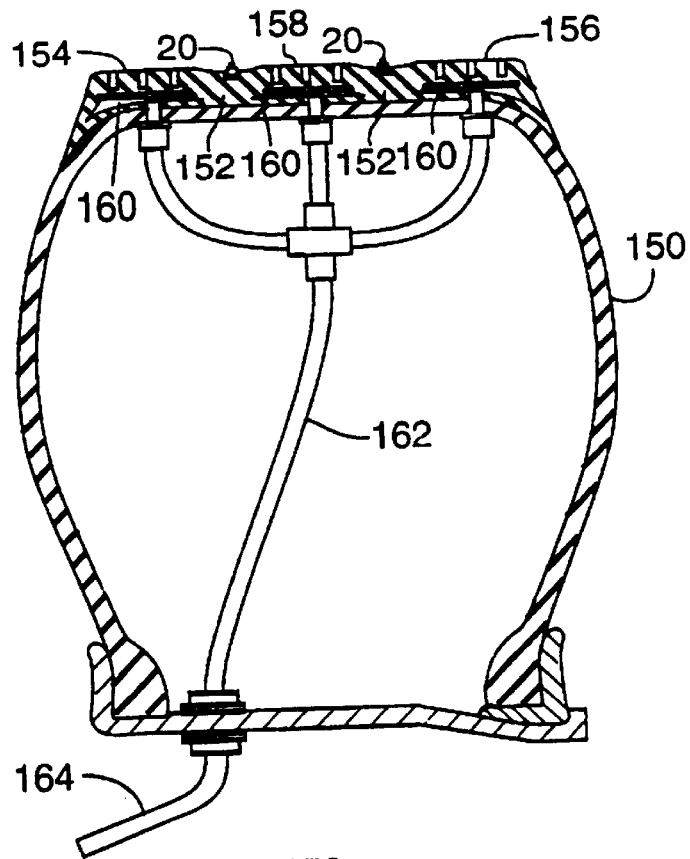
FIGS. 16 and 17 are views of another embodiment of a traction device applied to a single wheel.
Figure 17:
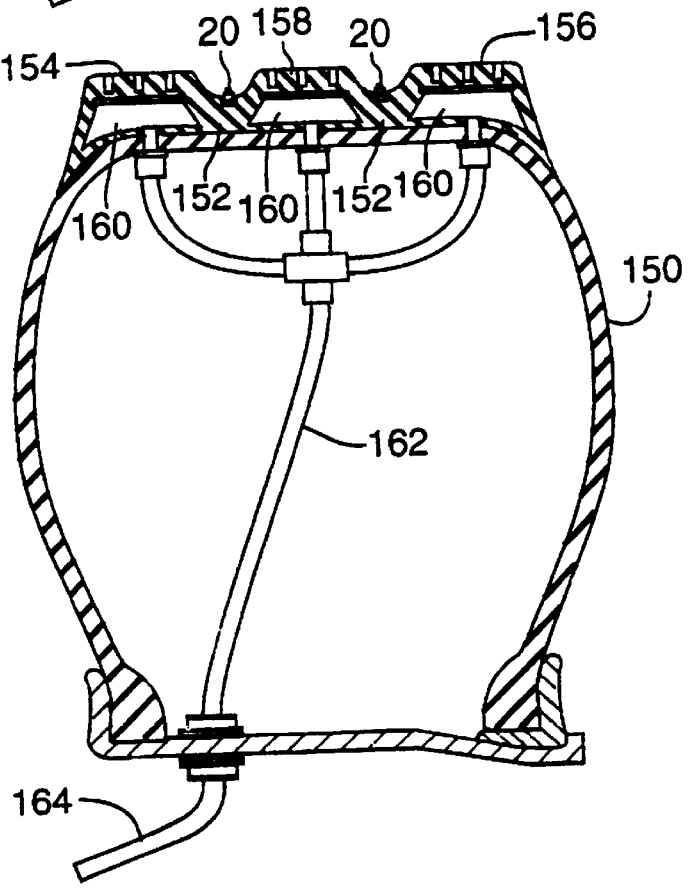

FIGS. 16 and 17 illustrate another traction device applied to a wheel 150. In this embodiment, studs 20 are provided at spaced intervals in two rows around the periphery of the wheel 150. The studs 20 project from a tread portion 152 of the wheel 150. The wheel 150 has side tread sections 154 and 156 and a center tread section 158. Each of the tread sections 154, 156 and 158 have a chamber 160 that is expandable and contractible. A hose 162 connects the chambers 160 to a valve stem 164. The chambers 160 are collapsible as illustrated in FIG. 16 to place the studs 20 in contact with the road surface. The chambers 160 are expandable as shown in FIG. 17 with the tread sections 154, 156 and 158 being expanded beyond the height of the studs 20 to thus keep the studs 20 out of contact with the road surface.

FIGS. 18 and 19 illustrate a traction device as applied to a single wheel 170. In this embodiment, the wheel 170 has a tread 172. The tread 172 has channels 174 formed (see FIGS. 23 and 24) around its periphery with the channels 174 being of a depth to receive replaceable tubular section 176. The tubular section 176 is provided with studs 20. The tubular section 176 is removably mounted in the channels 174 provided in the tire tread 172. The profile of the channels 174 in the tread 172 will have a profile that matches the profile of the tubular section 176 (see FIG. 23). The tubular section has sufficient elasticity such that they may be installed and removed on the wheel 170 as required. The tubular section 176 with studs 20 would be installed on the wheel 170 when additional traction is required such as in ice or snowy conditions and the studs 20 will provide the added traction required. Each tubular portion 176 is inflatable (expandable) by pressurized air and as shown in FIGS. 18, 19, the tubular portion 176 has a stem 180 that extends through an aperture 171 into the cavity portion of the wheel 170. A coupler 182 connects the stems 180 to an air line 184. Air line 184 is connected to a conventional valve stem 186 for inflating and deflating the tubular portion 176. The tubular portion 176 is contractible by releasing the pressurized air.

The tubular portion 176 is inflated by pressurized air so that the tubular portion 176 will be substantially even with the tread 172 of the wheel 170. When the tubular portion 176 is inflated to be even with the tread 172, the studs 20 will project beyond the tread 172 and the studs 20 of the tubular portion 176 thus will be in contact with the ground surface to provide additional traction.

Figure 20:
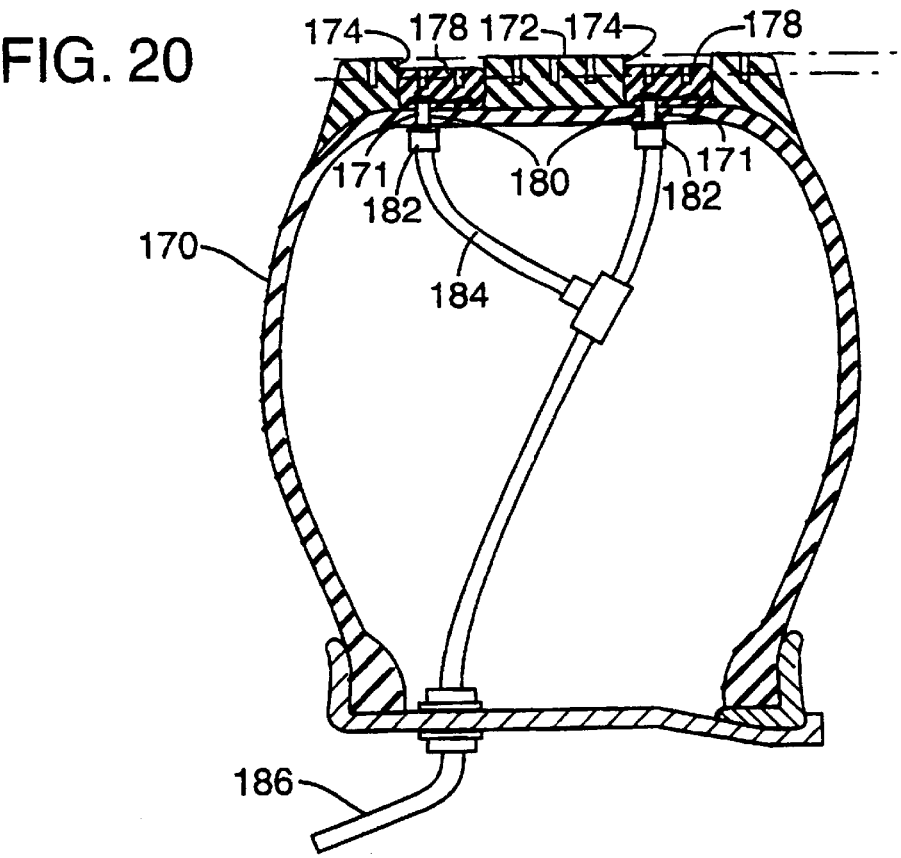
Figure 21:
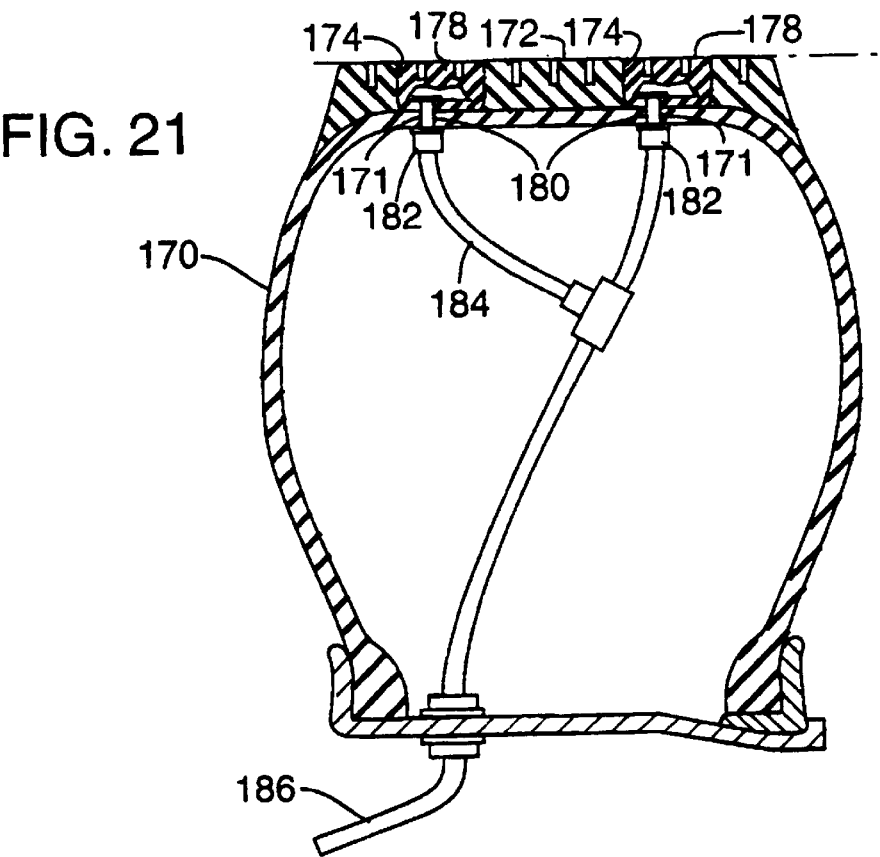
Figure 24:
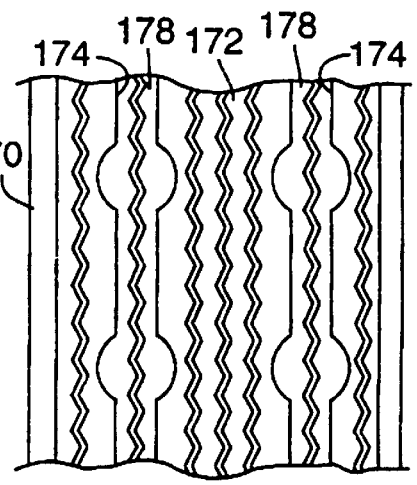

Tubular portion 178, as illustrated in FIGS. 20 and 21, is a filler unit that is most often utilized when additional traction afforded by the studs 20 is not required such as during the summer months. The tubular portion 178 when inflated (FIG. 21) will have its upper surface substantially even with the tread 172 of the wheel 170. The tubular portion 178 has a profile that will mate with the profile of the channel 174 (FIG. 24). The tubular portion 178 has a stem 180 that extends through the aperture 171 into the cavity portion of the wheel 170. A coupler 182 connects the stem 184 to an air line 184. Air line 184 is connected to a conventional valve stem 186 for inflating and deflating the tubular portion 178.

Figure 22:
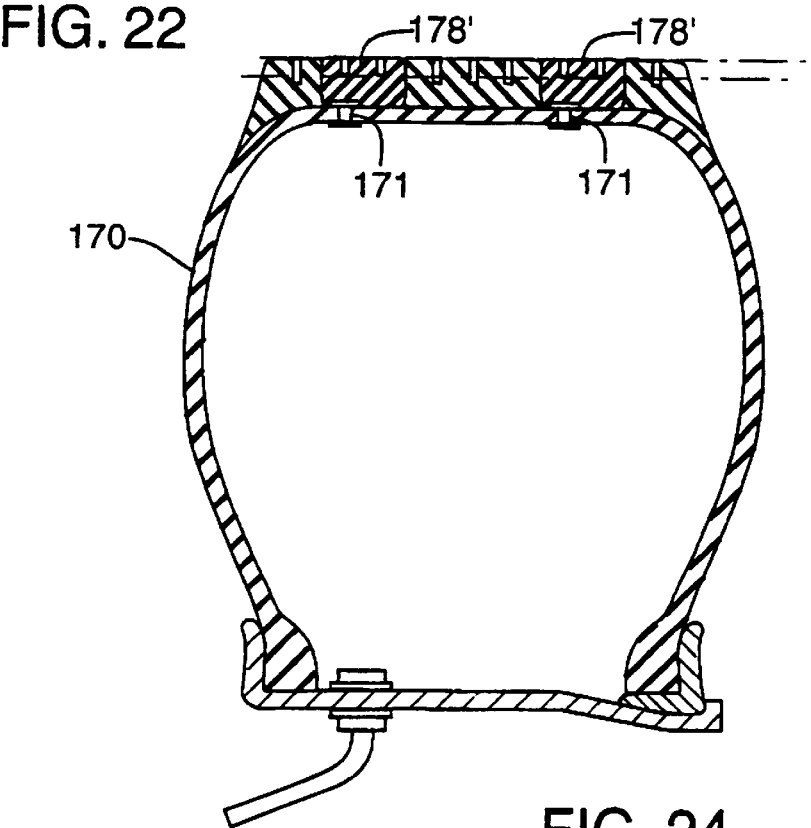
Figure 23:
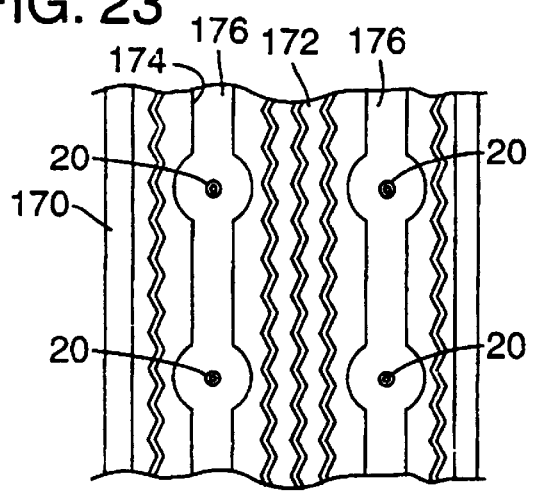

FIG. 22 illustrates a tubular portion 178' that is removably mounted in the channel 174 of the wheel 170. The tubular portion 178' has a stem 181 that fits in the aperture 171 to provide a seal for the cavity of the wheel 170. The tubular portion 178' has sufficient elasticity to permit mounting the tubular portion 178' in the channel 174 formed in the tread 172. It will be appreciated that the tubular portions 178' may also be provided with studs 20.

Figure 25:
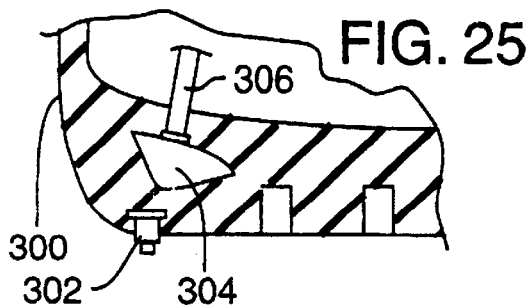
FIGS. 25 and 26 illustrate another embodiment of a traction device applied to a single wheel.
Figure 26:
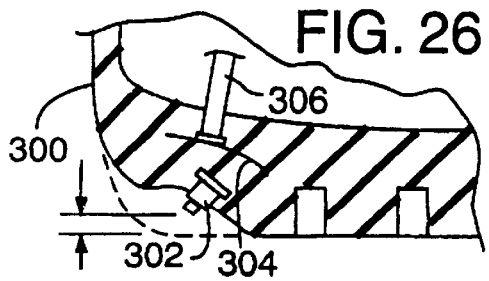

FIGS. 25 and 26 illustrate another embodiment of a tire 300 that has extendable and retractable studs 302. The tire 300 has an expandable and retractable chamber 304. A conduit 306 is connected to a known air source and valve system to supply air to and exhaust air from the chamber 304.

When the chamber 304 is expanded by applying air pressure, the stud 302 is moved outward and downward as shown in FIG. 25 so that the stud 302 will engage the road surface. When air is released from the chamber 304, the chamber retracts as illustrated in FIG. 26 which retracts the stud 302 so that it will not come into contact with the road surface.

Those skilled in the art will recognize that modifications and variations may be made without departing from the true spirit and scope of the invention. The invention is therefore not to be limited to the embodiments described and illustrated by is to be determined from the appended claims.

What is claimed is:

1. A wheel for mounting to a vehicle comprising:

a wheel hub and a tire mounted on the wheel hub, said tire having a primary chamber that is inflatable and in the inflated condition defines a circumferential portion for contacting a road surface;

at least two stud bearing tread segments in spaced apart relation provided on said circumferential portion of the tire and at least one non-stud bearing tread segment interposed between the stud bearing tread segments; and a secondary inflatable chamber associated with one of either the stud bearing tread segments and the non-stud bearing tread segment and an inlet control selectively providing the inflation and deflation of the secondary chamber whereby the studs of the stud bearing tread segments are placed in contact with the road surface and out of contact with the road surface in response to the inflation and deflation of the secondary inflatable chamber.

2. A wheel as defined in claim 1 wherein the secondary chamber is associated with the stud bearing tread segments whereby inflation of the secondary chamber forces extension of the stud bearing tread segments into contact with the road surface.

3. A wheel for mounting to a vehicle comprising:

a wheel hub and a tire mounted on the wheel hub, said tire having a primary chamber that is inflatable and in the inflated condition defines a circumferential portion for contacting a road surface;

at least two stud bearing tread segments in spaced apart relation provided on said circumferential portion of the tire and at least one non-stud bearing tread segment interposed between the stud bearing tread segments; and a secondary inflatable chamber associated with the stud bearing tread segments and an inlet control selectively providing the inflation and deflation of the secondary chamber whereby the studs of the stud bearing tread segments are placed in contact with the road surface and out of contact with the road surface in response to the inflation and deflation of the secondary inflatable chamber;

said stud bearing tread segments forming the side edges of the circumferential portion of the tire and in a state of deflation of said secondary chamber, said side edges are drawn inwardly of the remaining circumferential portion.

* * * * *